(12) United States Patent
Meyer

(10) Patent No.: US 7,652,469 B2
(45) Date of Patent: Jan. 26, 2010

(54) INDUCTIVE POSITION SENSOR

(75) Inventor: Hans Ulrich Meyer, Morges (CH)

(73) Assignee: Advanced Sensor Technology Limited, Central (HK)

( * ) Notice: Subject to any disclaimer, the term of this patent is extended or adjusted under 35 U.S.C. 154(b) by 270 days.

(21) Appl. No.: 11/777,578

(22) Filed: Jul. 13, 2007

(65) Prior Publication Data

US 2008/0018328 A1    Jan. 24, 2008

Related U.S. Application Data

(60) Provisional application No. 60/807,751, filed on Jul. 19, 2006.

(51) Int. Cl.
 *G01B 7/14* (2006.01)
 *H01F 5/00* (2006.01)
(52) U.S. Cl. .................... 324/207.17; 324/207.15; 324/207.16
(58) Field of Classification Search ............ 324/207.15, 324/207.16, 207.17, 207.22, 207.24, 207.25; 336/115, 130
See application file for complete search history.

(56) References Cited

U.S. PATENT DOCUMENTS

| | | | |
|---|---|---|---|
| 4,223,300 A * | 9/1980 | Wiklund ................. | 340/870.31 |
| 5,804,963 A | 9/1998 | Meyer | |
| 5,936,399 A * | 8/1999 | Andermo et al. ........ | 324/207.17 |
| 5,998,990 A * | 12/1999 | Andermo et al. ........ | 324/207.12 |
| 6,611,138 B2 * | 8/2003 | Vasiloiu ................. | 324/207.12 |
| 7,015,687 B2 | 3/2006 | Meyer | |
| 7,196,510 B2 * | 3/2007 | Kawatoko ............... | 324/207.17 |

* cited by examiner

*Primary Examiner*—Kenneth J Whittington
(74) *Attorney, Agent, or Firm*—Leydig, Voit & Mayer, Ltd.

(57) ABSTRACT

An inductive position sensor has a spatially periodic scale with a series of conducting or permeable features of pitch T and a reading head with drive windings and sense windings, facing the scale with a spatial period 2T along the scale. The windings are each divided in two identical winding elements, having the same relative location within two identical winding element patterns having a center-to-center distance along the scale of NT+T/2, N being an integer, and connected so that the winding element polarities in each winding are either opposed for drive windings and the same for sense windings or the same for drive windings and opposed for sense windings. Thereby, direct couplings in both patterns cancel each other, while the spatially periodic signals coupled via the scale reinforce each other.

12 Claims, 2 Drawing Sheets

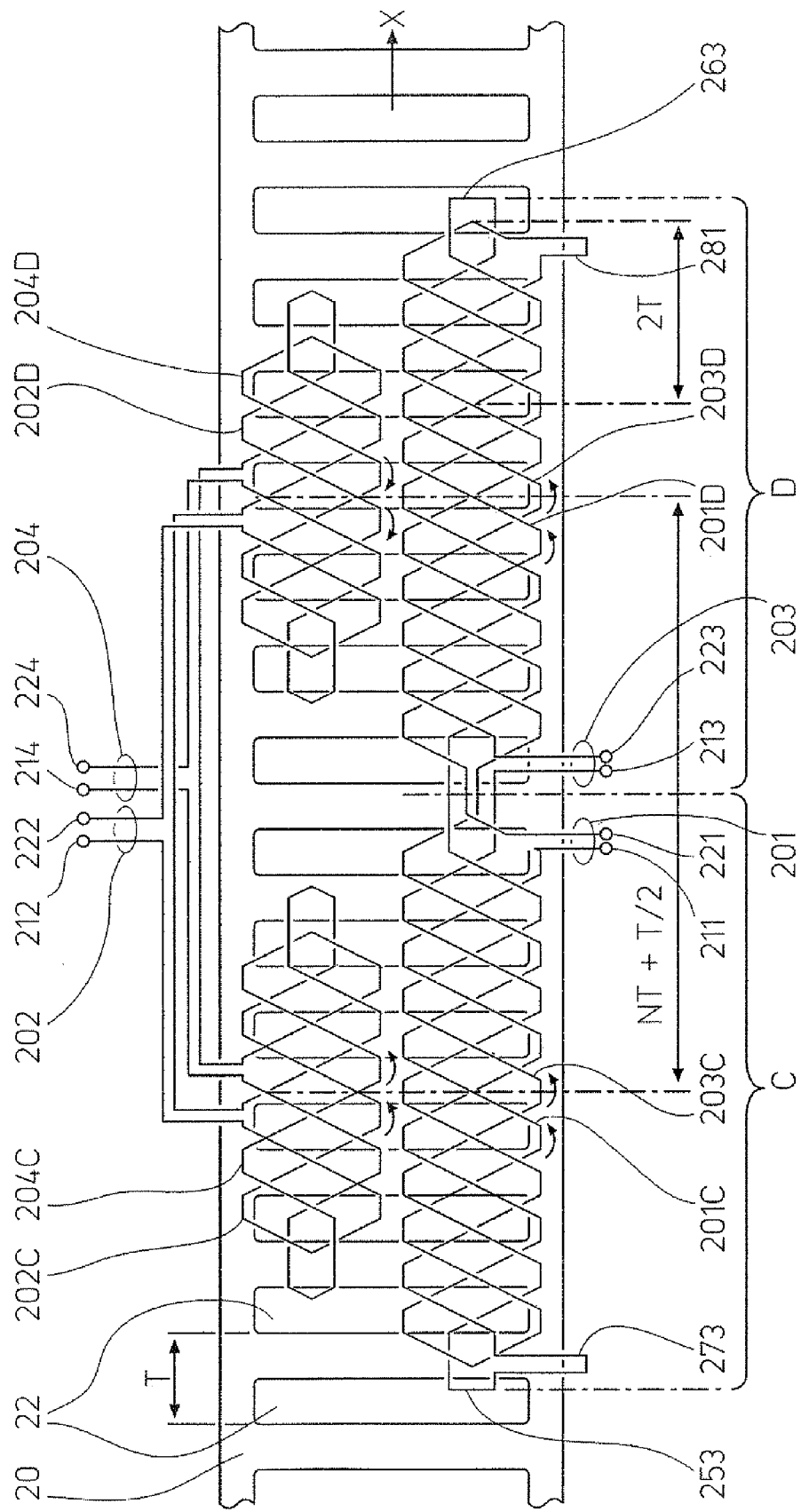

INDUCTIVE POSITION SENSOR

BACKGROUND OF THE INVENTION

This invention relates to an inductive position sensor, and more particularly to inductive position sensors having a relatively movable scale and reading head, the scale comprising a spatially periodic series of conducting or permeable features of spatial period T, and the reading head comprising drive and sense windings facing the scale with a spatially periodic configuration of spatial period T2 along the scale.

In such sensors, the signal coupled from one winding to another via the scale's spatially periodic features varies sinusoidally with the reading head's position along the scale, its spatial period being equal to the scale's spatial period T. Measuring two or more such signals yields two or more mutually shifted sinusoidal functions, from which the reading head's position along the scale may be determined. Such sensors are simple, rugged and compact. External shielding is usually unnecessary, as their multi-polar windings are hardly sensitive to external fields and do not generate appreciable far fields themselves. If required, though, a printed circuit copper layer provides adequate shielding at the high frequencies used with such low inductance windings.

A first example of such a sensor is disclosed in U.S. Pat. No. 5,804,963 to Meyer, the entire contents of which are incorporated herein by reference. All windings, whether inducing (drive windings) or induced (sense windings), are interlaced in the same area facing the scale's full width, and all have the same meander shape with a full zigzag spatial period T2, i.e. twice the scale's spatial period T. In this embodiment all scales work, notably the simpler ones based on eddy currents or on permeability, such as conductive or ferromagnetic gears and racks. Unfortunately, uneven direct coupling between interlaced windings sharing the same magnetic field creates measuring distortions. These worsen if the gap between scale and reading head increases, as it decreases coupling via the scale, but not direct coupling.

A second example of such a sensor is disclosed in U.S. Pat. No. 7,015,687 to Meyer, the entire contents of which are incorporated herein by reference. All windings are also meander-shaped, with a full zigzag spatial period T2, but the interlaced drive windings are separate from the interlaced sense windings. As they occupy separate areas, direct magnetic coupling between them is strongly reduced, so that coupling via the scale by means of closed conductor loops becomes predominant. This winding configuration is thus less sensitive to uneven direct coupling than the first embodiment even though some direct coupling remains between separate meander shaped windings.

BRIEF SUMMARY OF THE INVENTION

It is an object of the current invention to overcome or at least ameliorate some, but not all, shortcomings in prior art inductive sensors.

Accordingly, there is disclosed herein an inductive sensor in which the windings facing the scale are all divided in at least one pair of identical winding elements, each having the same relative location within each of at least one pair of distinct winding element patterns having the same shape and a center-to-center distance equal to NT+T/2, N being an integer, each winding's at least one pair of winding elements being connected so that their polarities are either opposed for each drive winding and equal for each sense winding or equal for each drive winding and opposed for each sense winding.

Therefore, the coupling between any drive winding and any sense winding within one of a pair of winding element pattern is opposed to the coupling within the other. Undesirable direct couplings between any drive and any sense winding within both winding element patterns are thus of opposite polarity. As long as both winding element patterns are identical, these direct couplings cancel each other out. This is normally the case if the reading head is built in printed circuit technology, each printed circuit being much smaller than the typical manufacturing size of circuit board panels: process parameters like over- or under-etching, layer-to-layer registration, separation between layers and scaling do thus not change appreciably within a single printed circuit. Even for marginal process parameters, the effect on all winding elements would still be the same, and direct couplings would still cancel. An advantage of this cancellation of direct couplings is that coupling via the scale can be weaker, making a larger gap possible: this is desirable from a mechanical point of view and also for accuracy, as a larger gap smoothes out distortions due to abrupt features such as conductor edges.

For the obviously desirable coupling via the scale between any drive and sense winding within one winding element pattern, the inverted coupling polarity and the scale shift of NT+T/2 combine, so that for any displacement, the variation of the coupled signal within each winding element pattern is the same. As a result, the spatially periodic coupled signals from each winding element pattern reinforce each other. If the spatially periodic coupled signal within one winding element pattern is biased, i.e. has a non-zero average value over one spatial period T, it is cancelled by the other winding element signal's bias, because of the inverted coupling polarity. This is of advantage, as it is easier to determine the spatial phase and amplitude of an unbiased signal. Moreover, measuring distortions of spatial period T due to uneven coupling via the scale are reduced, as the contributions from each winding element pattern, mutually shifted by T/2, tend to oppose each other.

Each winding's at least one pair of winding elements is optimally connected in series. This forces the same current through the drive winding elements of a same drive winding, thereby eliminating the effect of current mismatch between both winding element patterns. It also maximizes the voltage signal picked up by the sense windings.

A minimum separation is required between winding element patterns to avoid unwanted cross-coupling from one pattern's drive windings to the other pattern's sense windings. Advantageously, shielding in form of a conducting plane nearby attenuates the mutual inductances between winding elements. This allows a smaller separation between patterns, hence a shorter sensor.

In a favored embodiment, all windings facing the scale are interlaced together. This allows the use of any type of scale, particularly eddy-current or permeable ones, which tend to be simpler and sturdier, like conductive or ferromagnetic racks or gears. Additionally, the scale can be quite narrow, as all windings extend fully across the scale.

In a preferred embodiment, the interlaced drive windings facing the scale are separate from the interlaced sense windings facing the scale, i.e. drive and sense windings do not share the same area, strongly reducing direct magnetic coupling between them. Coupling takes place instead via conducting loops in the scale. This is the optimal solution for getting the best accuracy from such an inductive sensor realized in printed circuit technology This embodiment is thus eminently suitable for digital indicators, needing a sensor accurate to about one micrometer for scale periods T around 1 mm. However, this embodiment is also suitable for less accurate measuring tools, such as calipers, having a larger sensor scale period allowing a larger gap—and larger gap variations—between scale and reading head.

One important feature of sensors according to the invention is that their improvement in performance is only due to their characteristic winding configuration. Other than that, their function is unchanged, allowing the use of existing sensor electronics, e.g. as described in the U.S. Pat. No. 7,015,687 mentioned above.

BRIEF DESCRIPTION OF THE DRAWING

FIG. 2 shows a winding configuration over a ladder-like conducting scale for an embodiment having separately interlaced drive and sense windings.

DETAILED DESCRIPTION OF THE INVENTION

Figure 1:
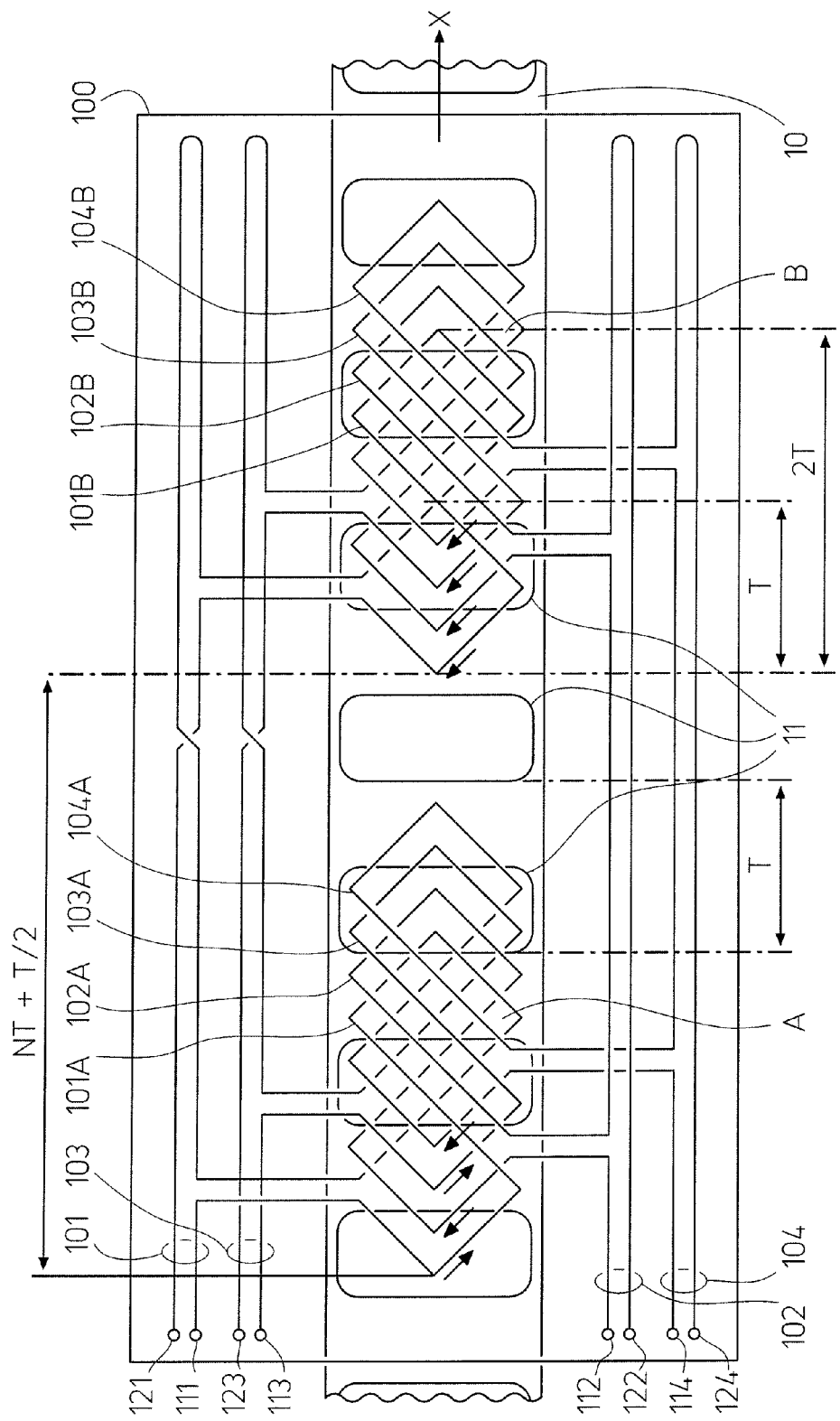
FIG. 1 shows a reading head's winding configuration over an eddy-current-type scale for an embodiment having all windings interlaced together.

A first embodiment of a sensor according to the invention is shown in FIG. 1. The sensor consists of a flat scale 10 relatively movable along a path x under a flat reading head 100 with four windings 101, 102, 103, 104 shown in transparency, as they are on or near the side facing the scale, i.e. under reading head 100 as seen from above. The scale 10 has a spatially periodic series of conducting screens 11, of spatial period T along path x, i.e. along the scale.

Each winding 101, 102, 103, 104 is divided in two separate identical winding elements facing the scale 10, respectively 101A and 101B, 102A and 102B, 103A and 103B, 104A and 10413. Winding elements 101A, 102A, 103A, 104A, shifted from each other by T/4, are interlaced together in a first winding element pattern A, and winding elements 101B, 102B, 103B, 104B, shifted from each other by T/4, are interlaced together in a second winding element pattern B, identical to the first. Pattern B is shifted from pattern A by NT+T/2, N being an integer. The relative position of the scale's screens 11 is thus shifted by T/2 between one pattern and the other: with reference to each pattern, the screens under pattern A are located in-between the relative positions of the screens under pattern B.

Each winding element facing the scale has its magnetic polarity reversing once per period T along the scale, so it has the same polarity every T2. Each winding element facing the scale thus has a spatially periodic configuration of period T2 along the scale. For the sake of clarity and to avoid crowding the drawing, the winding elements shown in FIG. 1, which could have any length, only extend over one winding period T2, so they have only two contra-rotating loops, i.e. two magnetic polarities each.

Windings 102 and 104 are drive windings and windings 101 and 103 are sense windings. Drive windings 102 and 104 are connected to driving circuits (not shown) through connectors 112, 122, and 114, 124, respectively. Sense windings 101 and 103 are connected to sensing circuits (not shown) through connectors 111, 121, and 113, 123, respectively.

Starting from connection 112, drive winding 102 enters its first winding element 102A, turns clockwise in the left loop and counter-clockwise in the right loop, exits and enters its second winding element 102B, turns clockwise in the left loop and counter-clockwise in the right loop, exits and goes back to its return connection 122. Likewise, drive winding 104 starts from connection 114 and goes through its winding elements 104A and 104B, turning clockwise in the left loop and counter-clockwise in the right loop of both winding elements. Each drive winding 102 or 104 is thus connected to have the same winding polarity in both its winding elements 102A, 102B or 104A, 104B facing the scale 10.

Starting from connection 111, sense winding 101 enters its first winding element 101A, turns counter-clockwise in the left loop and clockwise in the right loop, exits and enters its second winding element 101B, turns clockwise in the left loop and counter-clockwise in the right loop, exits and goes back to its return connection 121. Likewise for sense winding 103, starting at connection 113 and going through both winding elements 103A and 103B, with opposite turns in each left loop and in each right loop. Each sense winding 101 or 103 is thus connected to have opposite winding polarities in both its winding elements 101A, 101B or 103A, 103B facing the scale 10.

Arrows show the winding polarity in the leftmost conductors of winding elements 101A, 102A, 103A, 104A of pattern A, and of winding elements 101B, 102B, 103B, 104B, of pattern B.

In the embodiment shown in FIG. 1, the windings' conductors outside patterns A or B are laid out so as to minimize their coupling to other windings, even though this coupling is much weaker than the coupling within patterns A and B. To further diminish unwanted coupling, the reading head 100 may have a conducting screen (not shown), covering as much of the reading head's area as possible and located in a plane parallel to the windings, so that the flat windings lie in-between this screen and the scale. The screen has to be close enough to the flat windings to diminish unwanted coupling, but not too close to impair coupling via the scale. A screen-to-winding plane spacing of about 0.5 T is optimal. This allows a more compact reading head winding configuration. In particular, the separation between both patterns A and B may be reduced significantly. The presence of a screen is also beneficial for suppressing coupling between the windings and the rest of the circuitry (not shown), normally also located on the reading head, but on the side facing away from the scale. If the reading head is a printed circuit with the windings on one side and the rest of the circuitry on the other, a buried layer can be used as a screen.

The embodiment shown in FIG. 1 operates by measuring the amplitude of the signal coupled from each drive winding 102, 104 to each sense winding 101, 103. The presence of the scale's conducting screens 11 nearby changes the coupling, i.e. the signal's amplitude. The coupling from each drive winding 102, 104 to each sense winding 101, 103 varies thus periodically with a spatial period T as the position of the scale along the reading head 100 changes. A requirement for accuracy is that all couplings vary in a sinusoidal way and within the same range. For this to be the case, there should be the same direct coupling from each drive winding to each sense winding and all couplings via the scale should be uniform.

This is difficult to achieve for direct couplings as well as for couplings via the scale within only one winding element pattern A or B. In winding element pattern A, for example, it is obvious that direct coupling from the rightmost drive winding element 104A to the leftmost sense winding element 101A is weaker than the other couplings, as they are further apart. This is also true for coupling via scale 10, again because winding elements 101A and 104A are further apart: only the screens 11 near the middle of pattern A have a significant influence on coupling between these winding elements. This may be improved by making longer patterns, so that the uneven coupling contribution from the ends becomes relatively less important. Another improvement is to make the sense winding elements either longer or shorter along the scale than the drive winding elements to reduce if not eliminate coupling from the ends, resulting in more uniform couplings. Still, as direct coupling is preponderant, even a slight disparity in coupling will result in a significant signal distortion within one winding element pattern.

This embodiment provides a simple way to eliminate direct coupling, and to achieve more uniform coupling via the scale. The two winding element patterns A and B are of identical shape and distant enough to avoid cross-coupling from drive windings of one pattern to sense windings of the other. Winding elements 102A and 102B of drive winding 102, as well as winding elements 104A and 104B of drive winding 104, have the same winding polarity. Winding elements 101A and 101B of sense winding 101, as well as winding elements 103A and 103B of sense winding 103, have opposite polarities. The sense windings' polarities are opposed in both winding element patterns, while the drive windings polarities are the same. Direct couplings thus oppose each other in both winding element patterns, whereas the spatially periodic signal variations coupled via the scale in each winding element pattern reinforce each other because of the mutual scale shift of NT+T/2. It can be shown that for this embodiment, the signal coupled via the scale from any drive winding to any sense winding within one winding pattern as a function of displacement has a bias, i.e. a non-zero average value over one spatial period. However, just as for direct coupling, this bias is compensated by the bias from the signal coupled within the other pattern. This is of advantage, as it is easier to determine the spatial phase and amplitude of an unbiased signal.

The direct couplings from each drive winding 102, 104 to each sense winding 101, 103 within each pattern A and B cancel each other out if both patterns are identical. This is normally the case if reading head 100 is built in printed circuit technology, with each printed circuit being much smaller than the typical manufacturing size of circuit board panels: process parameters like over- or under-etching, layer-to-layer registration, separation between layers and scaling do not change appreciably within a single printed circuit. Even for marginal process parameters, the effect on all winding elements would still be the same, yielding largely identical winding element patterns. For even higher accuracy, thin film circuits on ceramic substrates or integrated circuits may be used instead of the lower-cost printed circuits.

Uneven coupling via the scale is also compensated in the embodiment shown in FIG. 1. Assuming the same relative scale feature position in both identical winding elements, the distortion created by each winding element pattern as a function of the position of the reading head along the scale would be the same. In reality, as the relative positions of scale features 11 in each winding element pattern A, B are shifted by half a scale pitch, i.e. T/2, both distortions, or at least their fundamental components of spatial period T, compensate each other. The one parameter most likely to change between both winding element patterns is the local gap to the scale. This will result in a lesser degree of compensation, but again, in this embodiment, uncompensated distortion from direct coupling is worse than uncompensated distortion from coupling via the scale.

The series-connected winding elements 102A and 102B, respectively 104A and 104B, of drive winding 102, respectively 104, carry the same current, thus eliminating the effect of drive current mismatch between both winding patterns A and B.

Having all four winding elements 101A, 102A, 103A, 104A interlaced in winding element pattern A and all four winding elements 101B, 102B, 103B, 104B interlaced in winding element pattern B has the advantage of a small reading head with a high degree of coupling requiring only narrow scales of the more common and simpler eddy current type.

The scale 10 of this embodiment consists of an insulating substrate with conducting areas 11, but a homogeneous conducting scale with a three-dimensional pattern, such as a rack, would work as well. It is also possible to replace the scale conductor or conductors by one ore several magnetically permeable elements, which increase rather than decrease the coupling between winding elements nearby. A scale alternating conducting and permeable areas is also feasible. This embodiment is thus optimal in applications requiring a small, simple, rugged scale, with sufficient accuracy.

A second embodiment of a sensor according to the invention is shown in FIG. 2. The sensor consists of a scale 20 movable along a path x under a reading head (outline not shown) with four windings 201, 202, 203, 204 lying on or near the side facing the scale. The flat ladder-like scale 20 is conducting and has a spatially periodic series of openings 22 with a spatial period T along the path x, i.e. along the scale.

Each winding 201, 202, 203, 204 is divided in two separate identical winding elements facing the scale 20, respectively winding elements 201C and 201D, winding elements 202C and 202D, winding elements 203C and 203D, and winding elements 204C and 204D. Winding elements 201C, 202C, 203C, 204C, shifted from each other along the scale by T/4, are interlaced by pairs in a winding element pattern C, and winding elements 201D, 202D, 203D, 204D, shifted from each other along the scale by T/4, are interlaced by pairs in a winding element pattern D identical to pattern C. Both patterns C and D are mutually shifted along the scale by NT+T/2, N being an integer. The relative position of the scale openings 22 to each pattern C or D is thus shifted by T/2: with reference to each pattern, the scale openings under pattern C are located in-between the relative positions of the scale openings under the other pattern D.

Each winding element 201C, 202C, 203C, 204C, 201D, 202D, 203D, 204D has its magnetic polarity reversing once per period T along scale 20, so it has the same polarity every T2. Each winding element thus has a spatially periodic configuration of spatial period T2 along the scale.

Windings 202 and 204 are drive windings, and windings 201 and 203 are sense windings. Drive windings 202 and 204 are connected to driving circuits (not shown) through connectors 212, 222, respectively 214, 224. Sense windings 201 and 203 are connected to sensing circuits (not shown) through connectors 211, 221, respectively 213, 223.

Starting from connection 212, drive winding 202 enters its first winding element 202C, turns counter-clockwise in the first loop it enters, exits and enters its second winding element 202D, turns clockwise in the first loop it enters, and goes back to its return connection 122. Likewise for drive winding 204, starting at connection 214 and going through its winding elements 204C, turning counter-clockwise in the first loop entered, and 204D, turning clockwise in the first loop entered. Each drive winding is thus connected to have opposite winding polarities in its two winding elements facing the scale 20. These opposite drive winding element polarities are visualized in FIG. 2 by four arrows, one under each drive winding element.

Starting from connection 211, sense winding 201 enters its first winding element 201C, exits and directly enters its second winding element 201D, exits and goes back to its return connection 221. Likewise for sense winding 203, starting at connection 213 and going through both winding elements 203C and 203D. The interconnection between winding element patterns C and D of winding elements 201C, 201D, as well as 203C, 203D is purposefully done so that, unlike the drive windings, each sense winding has the same winding polarity in each winding element facing the scale. These same sense winding element polarities are visualized in FIG. 2 by four arrows, one under each sense winding element.

Characteristically, this embodiment has separate drive and sense windings. Drive winding elements 202 and 204 are interlaced in both winding element patterns C and D, namely drive winding element 202C and 204C in pattern C and drive winding elements 202D and 204D in pattern D. Likewise, sense winding elements 201 and 203 are interlaced in both winding element patterns C and D, namely sense winding elements 201C and 203C in pattern C and sense winding elements 201D and 203D in pattern D. Unlike in the embodiment shown in FIG. 1, the drive windings and sense windings are not interlaced together in FIG. 2. They are separate, extending along the scale and alongside each other.

Sense winding elements 201C, 203C respectively 201D, 203D extend further along the scale than drive winding elements 202C, 204C respectively 202D, 204D, and define the extent along the scale of winding element patterns C and D. Sense winding elements 201C and 201D, as well as 203C and 203D, are thus directly connected together where winding element patterns C and D meet. Drive winding elements 202C, 204C as well as 202D, 204D are kept short enough to avoid cross-coupling to the sense winding elements of the other pattern.

To further diminish unwanted coupling, a conducting screen (not shown in FIG. 2), covering the winding element patterns C and D can be located in a plane parallel to the windings, so that the flat windings lie in-between this screen and the scale. This allows more compact winding element patterns. In particular, the separation required to avoid cross-coupling between the ends of the drive winding elements of one pattern and of the sense winding elements of the other pattern may be reduced. The presence of a screen is also beneficial for suppressing coupling between the windings and the rest of the circuitry (not shown), normally also located on the reading head, on the side facing away from the scale.

In the embodiment shown in FIG. 2, the interconnections between winding elements 201C, 201D or 202C, 202D or 203C, 203D or 204C, 204D and their connectors 211, 221 or 212, 222 or 213, 223 or 214, 224 plus the interconnections between drive winding elements 202C and 202D and between drive winding elements 204C and 204D, are only schematically shown for the description. Actually, these interconnections would be located with the rest of the circuitry on the side of the reading head (not shown) facing away from the scale, i.e. towards the viewer. Consequently, they are shielded from the winding elements facing the scale by the conducting screen, located in-between both sides of the reading head, e.g. as a buried layer in a printed circuit with the windings on the side facing the scale and the rest of the circuitry on the side facing away from the scale. These interconnections will thus not degrade the sensor's accuracy, as long as any significant direct coupling between drive and sense interconnections located on the reading head's side facing away from the scale is avoided.

On the reading head's side facing the scale 20, these interconnections are routed near or within each winding element pattern C or D to keep them as similar as possible electrically. To this end, each drive winding element 202C, 204C and 202D, 204D of drive winding patterns C and D is connected to the rest of the circuitry in exactly the same relative location in each pattern, e.g. as shown in FIG. 2 on top and just left of the middle for drive winding elements 202C and 202D, on top and just right of the middle for drive winding elements 204C and 204D. Also to this end, the sense windings' interconnections are routed close to where patterns C and D meet, on the bottom and slightly to the left for sense windings 201C and 201D, on the bottom and slightly to the right for sense windings 203C and 203D. Note that each interconnection is for both identical winding elements 201C and 201D, respectively 203C and 2031), because these sense winding elements are also directly interconnected with each other where patterns C and D meet. This is of course not the case for the drive winding elements, which have no conductors between them.

Even though these interconnections are routed near these sense windings' extremities, they might still be close enough to their own pattern's drive winding elements to be influenced by them, so that their effect has to be compensated in the other pattern. This is achieved by repeating these interconnections' traces in the other pattern: the interconnection to winding 201 located in pattern C is reproduced as trace 281 at the same relative position in pattern D and likewise the interconnection to winding 203 located in pattern D is reproduced as trace 273 at the same relative position in pattern C. The direct interconnections between sense winding elements 203C and 203D are reproduced in the traces 253 in pattern C for the direct interconnections within pattern D, and in the traces 263 in pattern D, for the direct interconnections within pattern C. As for the interconnections between elements 201C and 201D, both traces carry opposed currents and are superposed, so there is no need for compensation. In short, all uncompensated current-carrying traces of one pattern are duplicated in the other to get the same coupling conditions in both patterns.

The embodiment shown in FIG. 2 operates by measuring the amplitude of the signal coupled from each drive winding 202, 204 to each sense winding 201, 203. Currents, induced by each drive winding 202, 204 in the part of the scale 20 under them, circulate around the openings 22 and induce a voltage signal in each sense winding 201, 203: such a conducting ladder-shaped scale thus acts as a coupler between the separate drive and sense windings. The coupling from each drive winding 202, 204 to each sense winding 201, 203, varies thus periodically, with a spatial period T, as the position of the scale's openings 22 relative to the windings changes. A requirement for accuracy is that all couplings vary in a sinusoidal way and within the same range. For this to be the case, there should be the same residual direct coupling from each drive winding to each sense winding and all couplings via the scale should be uniform.

Spatial harmonics of the coupling function can be reduced by known techniques, such as a quasi-sinusoidal winding layout, and/or by increasing the gap between the scale and the reading head, as a larger gap smoothes out harmonic distortions from abrupt features like conductor edges. However, a larger gap reduces coupling, so that direct coupling should be reduced accordingly.

Even though direct coupling is considerably weaker between the separate drive and sense windings of this embodiment than between the interlaced drive and sense windings of the first embodiment, it still exists. Also, distortion for a given amount of direct coupling will be larger, as coupling via the scale for a given gap is reduced by the windings extending only halfway across the width of the scale in this embodiment, rather than fully across in the first embodiment.

In addition to the requirement for both winding element patterns C and D to be identical, there should be no cross-coupling from drive winding elements in one pattern to sense winding elements in the other. To this effect, drive winding elements 202C, 204C as well as 202D, 204D are kept short enough and in the middle of their patterns C or D to avoid cross-coupling from the drive windings of one pattern to the sense windings of the other. Conversely, sense winding elements 201C, 203C or 201D, 203D extend all along their pattern C or D. This minimizes differences in direct coupling already within each pattern C or D, as the sense winding elements' ends are just as far from the drive windings S as the sense windings from the other pattern are: if there is negligible cross-coupling between drive winding elements in one pattern and sense winding elements in the other, then it follows that coupling from the drive windings to the sense winding elements' ends within the same pattern is also negligible. Making the drive windings longer instead would bring the same benefit. The comparatively higher drive winding inductance would result in lower power consumption, whereas the embodiment's longer sense windings deliver a larger coupling signal. Whether the drive or the sense windings should be longer depends on which feature is more important for a given application.

This embodiment provides a simple way to eliminate direct coupling, and to get more uniform coupling via the scale. Winding elements 202C and 202D of drive winding 202, as well as winding elements 204C and 204D of drive winding 204, have opposite winding polarities. Winding elements 201C and 201D of sense winding 201, as well as winding elements 203C and 203D of sense winding 203, have the same polarity. To sum it up, the drive windings polarities are opposed in both winding element patterns, while the sense windings' polarities are the same in both patterns. Direct couplings thus oppose each other in both patterns, whereas the spatially periodic signal variations coupled via the scale in each pattern reinforce each other because of the mutual scale shift by NT+T/2. It can be shown that for this embodiment too, the signal coupled via the scale from any drive winding to any sense winding within one pattern as a function of displacement has a bias, i.e. a non-zero average value over one spatial period T. However, just as for direct coupling, this bias is compensated by the bias from the signal coupled within the other pattern. This is of advantage, as it is easier to determine the spatial phase and amplitude of an unbiased signal.

The direct couplings from each drive winding 202, 204 to each sense winding 201, 203 within each pattern C and D cancel each other out if both patterns are identical. This is normally the case if the reading head (not shown) is built in printed circuit technology, with each printed circuit being much smaller than the typical manufacturing size of circuit board panels: process parameters like over- or under-etching, layer-to-layer registration, separation between layers and scaling do not change appreciably within a single printed circuit. Even for marginal process parameters, the effect on all winding elements would still be the same, yielding largely identical winding element patterns. For even higher accuracy, thin film circuits on ceramic substrates or integrated circuits may be used instead of lower cost printed circuits.

The series-connected winding elements 202C and 202D, respectively 204C and 204D, of drive winding 202, respectively 204, carry the same current, thus eliminating the effect of drive current mismatch between both winding patterns C and D.

Uneven coupling via the scale is also compensated in the embodiment shown in FIG. 2. Assuming the same relative scale feature position in both identical winding elements, the distortion created by each winding element pattern as a function of the position of the reading head along the scale would be the same. In reality, as the relative scale feature 22 positions in each winding element pattern C, D are shifted by half a scale spatial pitch, i.e. T/2, both distortions, or at least their fundamental components of spatial period T, compensate each other. The one parameter most likely to change between both winding element patterns is the local gap to the scale but its effect is limited: even if the local change in gap were as high as T/10, which can be considered extreme in such sensors, the degree of compensation would still cut measuring errors by more than half. With a careful layout, couplings within each pattern C or D are already quite uniform, so that the resulting accuracy would still be fine. However, the main advantage of this embodiment is that it allows a larger gap between reading head and scale, which is again beneficial to accuracy, as a larger gap smoothes out distortions from abrupt features like conductor edges on the scale or on the reading head.

This embodiment is thus eminently suitable for making small reading heads manufactured in printed circuit technology, e.g. for dial indicators and digital gages, with accuracies around one micrometer for scale periods T around 1 mm and gaps around 0.1 mm. However, this embodiment is also suitable for less accurate applications with higher gaps and misalignment tolerances between reading head and scale, such as calipers and retro-fit linear encoders: accuracies stay within 10 micrometers for scale periods T around 2 mm and gaps up to 0.5 mm.

Many other scale patterns are possible, as long as no significant coupling occurs along the length of the scale, as it would lead to coupling between patterns C and D. Instead of the flat conducting ladder-shaped scale with openings, an insulating scale with a series of conducting loops isolated from each other could be used as well. Electrical coupling via current loops around scale loops or openings may be replaced by magnetic coupling through permeable elements, e.g. ferrite bars, arrayed at a pitch T.

One important advantage of sensors according to the invention is that their better performance is only due to their original winding configuration. Other than that, the number of connections to the drive and sense circuits remains the same and their function can be left unchanged. This allows the use of existing sensor electronics, e.g. as described in U.S. Pat. No. 7,015,617. These electronics may even be simplified and/or become more accurate, as bias from direct coupling as well as bias from coupling via the scale is eliminated: the periodic coupling signals—ideally sine waves—during a constant speed movement of the scale past the reading head would be without offset, i.e. have an average value of zero.

The scope of the invention is not limited to the embodiments described herein, and many variants are possible. The number of drive and sense windings may be higher than two. There could be a number of pairs of identical winding element patterns, especially in long reading heads. The scale could move on a circumferential path x, as in rotary encoders. The scale and the reading head could be coaxial cylinders, and have an axial or a circumferential path. Although the sensors described above are conceived as incremental sensors measuring over many scale periods T, their good linearity, compact design and high operating frequency (no need for wire wound coils with ferrite cores) makes them quite useful as absolute sensors, i.e. with a measuring range shorter than T, in applications normally using differential transformer (LVDT) or half bridge inductive position sensors or transducers.

What I claim is:

1. An inductive position sensor including:
   a relatively movable scale; and
   a reading head,
      the scale comprising a spatially periodic series of conducting or permeable features of spatial period T, and
      the reading head comprising drive and sense windings facing the scale with a spatially periodic configuration of spatial period 2T along the scale, wherein the windings facing the scale are all divided into at least one pair of identical winding elements, each winding element having the same relative location within one of at least one pair of distinct winding element patterns and having the same shape, the winding elements of the at least one pair have a center-to-center distance equal to NT+T/2, N being an integer, and the at least one pair of winding elements of each drive winding and of each sense winding being connected so that their polarities are either opposed for each drive winding and the same for each sense winding, or the same for each drive winding and opposed for each sense winding.

2. The sensor according to claim 1, wherein the at least one pair of winding elements is connected in series.

3. The sensor according to claim 1, wherein all winding elements share the same area and are interlaced together within each winding element pattern.

4. The sensor according to claim 3, wherein
the winding elements include drive winding elements and sense winding elements, and
the drive winding elements that are interlaced are separate from the sense winding elements that are interlaced within each winding element pattern.

5. The sensor according to claim 1, wherein two drive windings are mutually shifted by T/2 along the scale within each winding element pattern and two sense windings are mutually shifted by T/2 along the scale within each winding element pattern.

6. An inductive sensor comprising:
a scale having a spatially periodic series of conductive or permeable features of spatial period T,
a drive winding divided into identical first and second drive winding elements located spatially adjacent the scale, the first and second drive winding elements being separated from each other by a distance equal to NT+T/2, wherein N is an integer, and
a sense winding divided into identical first and second sense winding elements located spatially adjacent the scale and adjacent respective ones of the drive winding elements, wherein the drive and sense winding elements are each connected to have a polarity, and three of the drive and sense winding elements are connected to have a first polarity and one of the drive and sense winding elements is connected to have a second polarity, opposite the first polarity.

7. The inductive sensor of claim 6, wherein the integer N is chosen such that there is negligible inductive coupling between the first and second drive winding elements.

8. The inductive sensor of claim 6, wherein respective drive winding elements and sense winding elements are located at a spatial distance from each other of T/4.

9. The inductive sensor of claim 6, wherein respective drive winding elements and sense winding elements are interlaced.

10. The inductive sensor of claim 9, wherein the winding element having the second polarity is a sense winding element.

11. A method in an inductive sensor of reducing direct coupling between a drive winding and a sense winding, both of the sense and drive and sense windings being located adjacent a scale having a spatially periodic series of conducting or permeable features of spatial period T, the method comprising:
dividing the drive winding into identical first and second drive winding elements and separating the drive winding elements from each other by a distance equal to NT+T/2 along the scale, wherein N is an integer,
dividing the sense winding into identical first and second sense winding elements and locating the sense winding elements adjacent respective ones of the drive winding elements, and
connecting each of the winding elements to have a polarity, wherein three of the drive and sense winding elements are connected to have a first polarity and one of the drive and sense winding elements is connected to have a second polarity, opposite the first polarity.

12. The method of claim 11, further including choosing a value of the integer N such that there is negligible inductive coupling between the first and second drive winding elements.

* * * * *